(12) United States Patent
Yeh et al.

(10) Patent No.: US 7,903,600 B2
(45) Date of Patent: Mar. 8, 2011

(54) CONTROL OF CDMA SIGNAL INTEGRATION

(75) Inventors: Hsin-chung Yeh, Hsinchu (TW); Zong-hua You, Hsinchu (TW)

(73) Assignee: MEDIATEK Inc., Hsin-Chu (TW)

( * ) Notice: Subject to any disclaimer, the term of this patent is extended or adjusted under 35 U.S.C. 154(b) by 914 days.

(21) Appl. No.: 11/773,772

(22) Filed: Jul. 5, 2007

(65) Prior Publication Data
US 2009/0010239 A1  Jan. 8, 2009

(51) Int. Cl.
H04B 7/216 (2006.01)
(52) U.S. Cl. ........................ 370/320; 370/318; 370/319
(58) Field of Classification Search .................. 370/318, 370/320
See application file for complete search history.

(56) References Cited

U.S. PATENT DOCUMENTS

| | | | | |
|---|---|---|---|---|
| 3,597,752 A | * | 8/1971 | Eldert et al. | 360/40 |
| 4,095,222 A | * | 6/1978 | Mooney, Jr. | 342/93 |
| 5,095,538 A | * | 3/1992 | Durboraw, III | 455/71 |
| 5,166,598 A | * | 11/1992 | Gallegos et al. | 324/76.37 |
| 5,420,593 A | * | 5/1995 | Niles | 342/357.12 |
| 5,577,025 A | * | 11/1996 | Skinner et al. | 370/209 |
| 6,300,899 B1 | * | 10/2001 | King | 342/357.12 |
| 6,965,760 B1 | * | 11/2005 | Chen et al. | 455/226.1 |
| 6,977,974 B1 | * | 12/2005 | Geraniotis et al. | 375/340 |
| 7,266,144 B1 | * | 9/2007 | Sanders | 375/150 |
| 7,366,226 B2 | * | 4/2008 | Zhao et al. | 375/141 |
| 7,522,100 B2 | * | 4/2009 | Yang et al. | 342/357.12 |
| 2004/0076225 A1 | * | 4/2004 | You et al. | 375/148 |
| 2005/0275588 A1 | * | 12/2005 | Schiffmiller et al. | 342/387 |
| 2006/0014507 A1 | * | 1/2006 | Giancola et al. | 455/232.1 |
| 2007/0013583 A1 | * | 1/2007 | Wang et al. | 342/357.15 |
| 2007/0206663 A1 | * | 9/2007 | Grover et al. | 375/147 |
| 2008/0130794 A1 | * | 6/2008 | Chong et al. | 375/317 |
| 2008/0143598 A1 | * | 6/2008 | Heckler et al. | 342/357.12 |
| 2008/0220736 A1 | * | 9/2008 | Yeh | 455/296 |
| 2009/0284747 A1 | * | 11/2009 | Valois | 356/448 |

* cited by examiner

Primary Examiner — Kent Chang
Assistant Examiner — Ronald Eisner (57) ABSTRACT

A method for controlling integration for a CDMA signal and a receiver implementing the same. In accordance with the present invention, non-coherent and even coherent integration periods for a received signal are dynamically and adaptively controlled depending upon the condition of the received signal. The integration period can be very short when signal strength is strong and no blocking exists; while it can be extended to be longer when the signal strength is weak or there is a blocking. Therefore, it is possible to keep locking even under bad circumstances. In addition, the fix time can be shortened when the signal strength is very strong.

16 Claims, 8 Drawing Sheets

CONTROL OF CDMA SIGNAL INTEGRATION

TECHNICAL FIELD OF THE INVENTION

The present invention relates to GNSS navigation, more particularly, to control of coherent and non-coherent integrations of a receiver for CDMA signals.

BACKGROUND OF THE INVENTION

Code Division Multiple Access (CDMA) has been widely used in satellite communication field such as GNSS. Civic GPS (Global Positioning System) application is rapidly developed. To achieve excellent GPS navigation, sufficiently available satellite number and qualified signal measurement accuracy are basic requirements to be satisfied. However, such conditions are hardly satisfied in deep urban circumstances.

A GPS receiver suffers problem when receiving signals in urban. For example, signal power level may abruptly and rapidly change since the receiver, which may be set up in a vehicle, is moving, or the signal is blocked by buildings.

The receiver uses coherent integration and non-coherent integration to obtain sufficient signal power. Conventionally, a coherent integration period is fixed and is ranged from 1 ms to 20 ms, in general. In addition, a non-coherent number is also set in advance. If the coherent integration period is predetermined to be 20 ms, the receiver integrates the receiver power for 20 ms. The 20 ms coherent integration is stored, and another 20 ms coherent integration is calculated. The 20 ms coherent integrations are accumulated. The non-coherent number of coherent integrations are accumulated. This is called non-coherent integration. A non-coherent integration period is predetermined since the non-coherent number is fixed. For example, the non-coherent integration period is predetermined as 2 seconds. Then, the 20 ms coherent integrations are accumulated until a 2-second non-coherent integration is obtained. The non-coherent integrated signal power is checked to see if it is sufficiently high. However, in bad circumstances, such as urban, the signal may be sometimes very weak or even be blocked. It will take a significantly long time to obtain sufficient signal power level by using the prior art scheme. For example, when a receiver receives a satellite signal in urban environment, the power of the satellite signal may be changed dramatically. The strong signal power may suddenly become weak. Under such a circumstance, the receiver is likely to lose lock for the satellite if the integration time is not long enough. Therefore, it is necessary to use a long integration interval. However, the weak signal power may also suddenly become strong. If the long integration time interval is still used, the response of the receiver to the satellite signal will become slow and blunt. To overcome such a problem, the integration period needs to be more effectively and adaptively controlled.

SUMMARY OF THE INVENTION

The present invention is to provide a method for controlling integration for a CDMA signal. By using the method of the present invention, integration period for the signal can be effectively and adaptively controlled. Therefore, it is possible to keep locking the signal even when the signal strength is weak or there is blocking. In addition, the fix time can be effectively shortened.

The method comprises steps of executing coherent integration for a coherent integration period and storing the coherent integration result into a first memory; calculating a signal power from the coherent integration result; accumulating the signal power of each coherent integration into a second memory as a non-coherent integration comparing the accumulated signal power with a threshold; and repeating the above steps if the accumulated signal power has not exceeded the threshold while stopping accumulating if the accumulated signal power exceeds the threshold.

In the case that the coherent period is set to be long, the coherent period can be divided into a plurality of sub-units. The coherent integration result is calculated to obtain an updated signal power by every sub-unit, and the signal power is compared with the threshold, the signal power is used in further processing if it exceeds the threshold.

The present invention is further to provide a receiver for receiving CDMA signals. The integration period for the signal received by the receiver can be effectively and adaptively controlled. Therefore, it is possible to keep locking the signal even when the signal strength is weak or there is blocking. In addition, the fix time can be effectively shortened.

The receiver comprises an antenna for receiving a signal; a correlator for executing correlation to the signal; a coherent integration block executing a coherent integration to the signal for a coherent integration period; a magnitude calculator calculating a signal power from a result of the coherent integration of the coherent integration block; a non-coherent integration block accumulating the signal power of each coherent integration as a non-coherent integration; a comparator comparing the signal power with a threshold whenever signal power of a coherent integration is accumulated to the non-coherent block; and a controller stopping the non-coherent integration and passing the signal to further process when the signal power exceeds the threshold.

In the case that the coherent period is set to be long, the coherent integration period is divided into a plurality of sub-units, the magnitude calculator calculates the coherent integration result and updates the signal power by each sub-unit for the first coherent integration period, and the comparator compares the signal power with the threshold.

BRIEF DESCRIPTION OF THE DRAWINGS

The present invention will be further described in details in conjunction with the accompanying drawings.

DETAILED DESCRIPTION OF THE INVENTION

Figure 1:
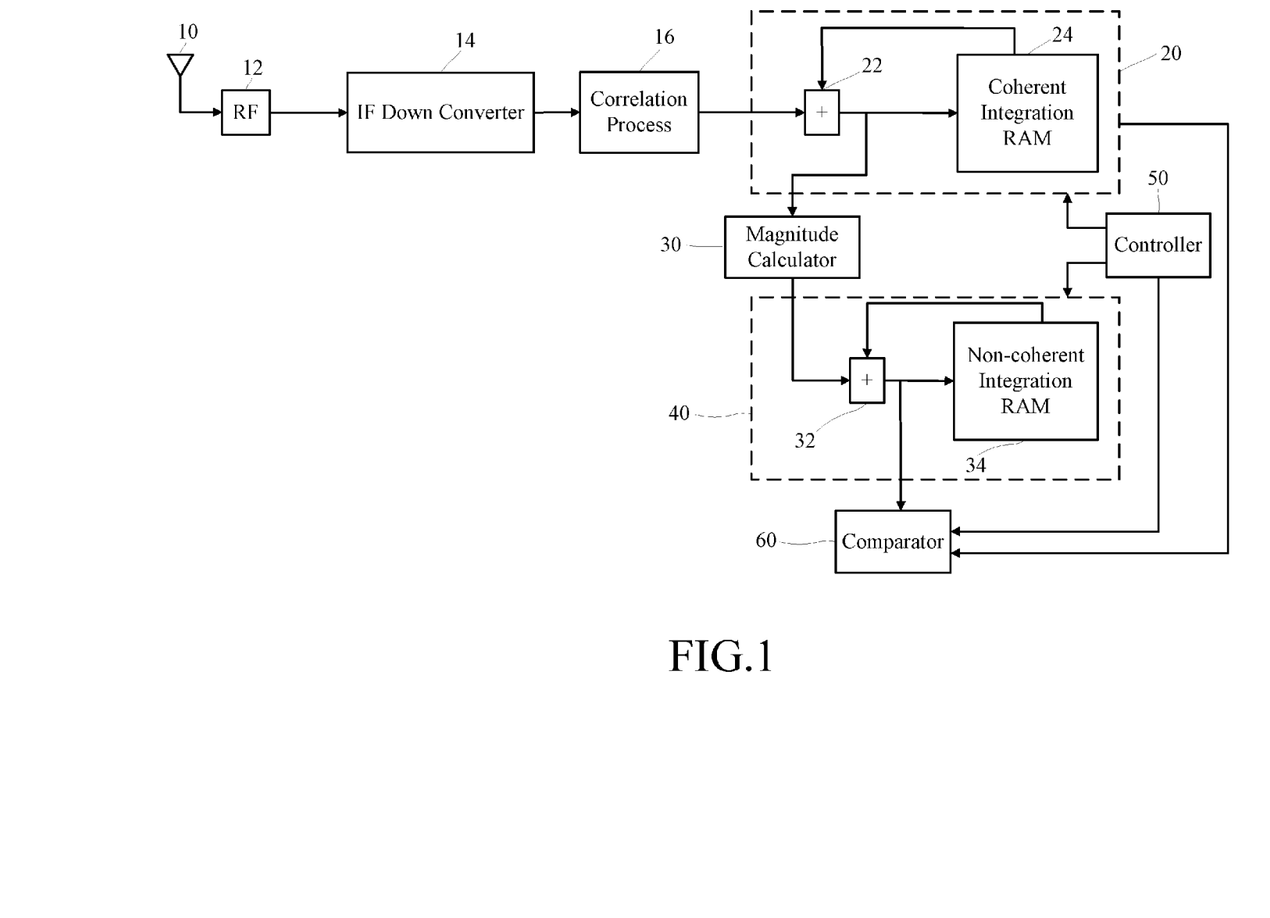
FIG. 1 is a schematic block diagram showing a general structure of a receiver in accordance with the present invention.

FIG. 1 is a schematic block diagram showing a general structure of a receiver in accordance with the present invention. The receiver is used for GNSS (e.g. GPS). The receiver includes an antenna 10 for receiving RF signals such as satellite signals of CDMA form, an IF down converter 14 for converting the RF signals into IF signals, and a correlation unit for conducting correlation to the IF signals. The receiver further includes a coherent integration block 20, which has an adder 22 and a coherent integration RAM (or memory of another type) 24, a magnitude calculator 30, a non-coherent integration block 40, which has an adder 32 and a non-coherent integration RAM (or memory of another type), a controller and a comparator 60. The details will be further described later.

Figure 2:
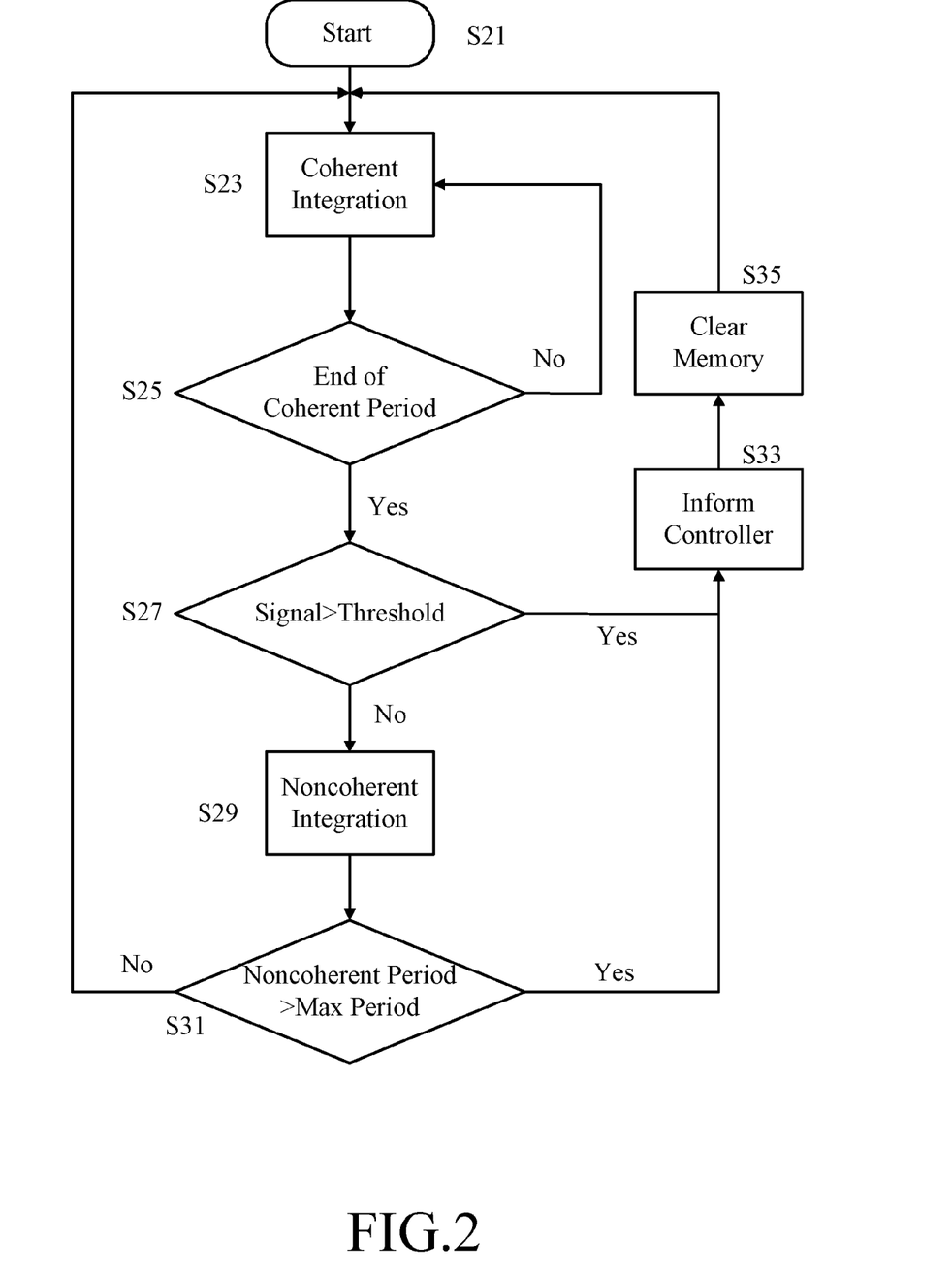
FIG. 2 is a flow chart generally illustrating a process of an embodiment in accordance with the present invention.

An embodiment of the present invention will be described in conjunction with FIG. 2, which is flow chart illustrating a process in accordance with the present invention. In the present embodiment, coherent integration period (simply referred to as "coherent period") is set as 1 ms. The process starts from step S21, the receiver receives GPS signals, for example. In step S23, coherent integration is conducted to the received signals. When a coherent period ends (step S25), the comparator 60 compares the signal power obtained from the coherent integration with a threshold (step S27). It is noted that the signal power is calculated by the magnitude calculator 30, which may calculate the signal power from I and Q components of the signal or simply I component stored in the coherent integration memory 24, depending on the condition. If the signal strength is very strong, it is possible to obtain sufficient signal power within one ms. If the signal power has exceeded the threshold, the comparator 60 informs the controller 50 (step S33), and the controller 50 clears up the coherent integration memory 24 accordingly (step S35). A new coherent integration can be started then. If the signal power has not exceeded the threshold, the calculated coherent integration (i.e. coherent signal power) is sent to the non-coherent block 40 and stored in the non-coherent integration memory 34 to be accumulated, this is called non-coherent integration (step S29). In the present embodiment, before a predetermined non-coherent maximum period is reached (step S31), whenever a coherent integration is completed, the signal power is accumulated to the non-coherent integration memory 34. The accumulated signal power is compared with the threshold by the comparator 60. Once the threshold is achieved, the controller passes the signal power to be used for navigation. In other words, the non-coherent integration period is dynamically variable rather than fixed.

In a condition that the signal strength is strong, the non-coherent integration period can be very short. However, in a condition that the signal strength is weak or signal is blocked, the non-coherent integration period can be extended. It is noted that the threshold is also adjusted by the controller 50 as the non-coherent integration period is varied. When the non-coherent integration period is long, the effect of noises will be more significant, therefore the threshold should be higher. The threshold is determined depending on the coherent integration period and the non-coherent integration period. The advantage of the present invention can be easily observed by comparing FIG. 3 and FIG. 4, which will be described as follows.

Figure 3:
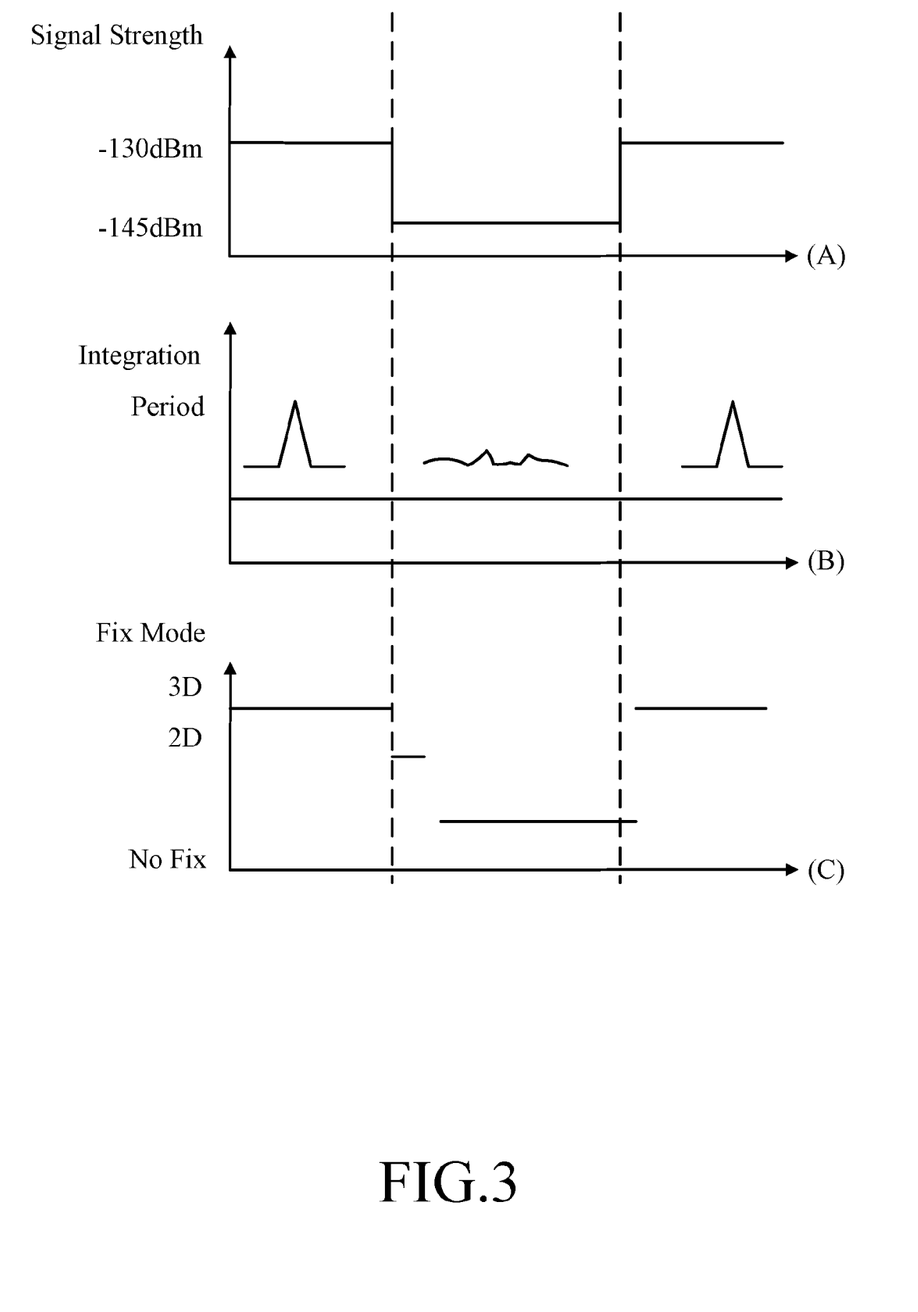
FIG. 3 shows relationships among signal strength, integration period and fix state according to prior art.
Figure 4:
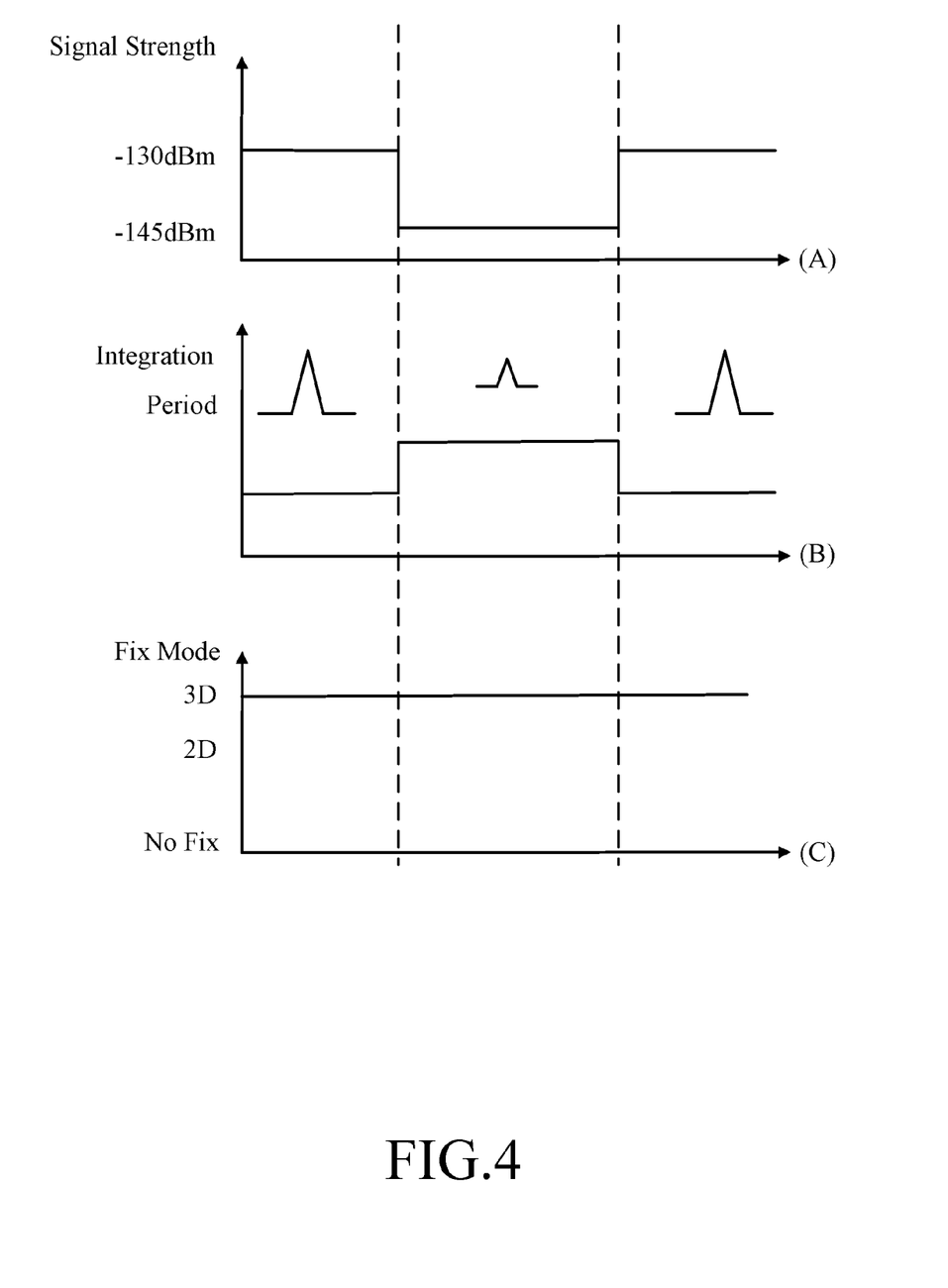
FIG. 4 shows relationships among signal strength, integration period and fix state according to the present invention.

FIG. 3 shows relationships among signal strength, integration period and fix state according to prior art. In this example, the normal signal strength is −130 dBm. The signal strength drops below −145 dBm when the receiver, which may be carried in a vehicle, passes through some blockings such as buildings or trees. When the blockings have been passed, the signal strength recovers to be −130 dBm. In prior art, the non-coherent integration period is fixed, and therefore the integrated signal power is abruptly drops as shown. The fix state of 3D or 2D fix mode for the receiver is very poor. FIG. 4 shows relationships among signal strength, integration period and fix state according to the present invention. As can be seen, when the signal strength drops to the low level, the non-coherent integration period is extended, so that the signal power can be maintained sufficiently high. Therefore, the fix state of 3D or 2D fix mode for the receiver can be maintained to be excellent even when the signal is temporarily blocked.

As mentioned, the coherent integration period is usually ranged from 1 ms to 20 ms for GPS in practice. If the coherent integration period is selected to be long, (e.g. 20 ms), the coherent integration period is also controlled in accordance with the present invention. Assuming the coherent integration period is set as 20 ms, conventionally, the I and Q components of a received signal is stored and accumulated in the coherent integration memory. The magnitude calculator calculates the signal power every 20 ms and the coherent integration memory is cleared for the next coherent integration. In the present embodiment of the present invention, the I and Q components of the signal are accumulated to the coherent integration memory 24 within 20 ms the same as before. However, the magnitude calculator 30 calculates the signal power every 1 ms, and the comparator 60 compares the calculated signal power. When the signal power exceeds the threshold provided by the controller 50, the controller stops the coherent integration and sends the signal power to successive processing. If sufficiently high signal power is failed to be obtained within the first coherent integration period, then the process will be the same as that described with reference to FIG .2.

Figure 5:
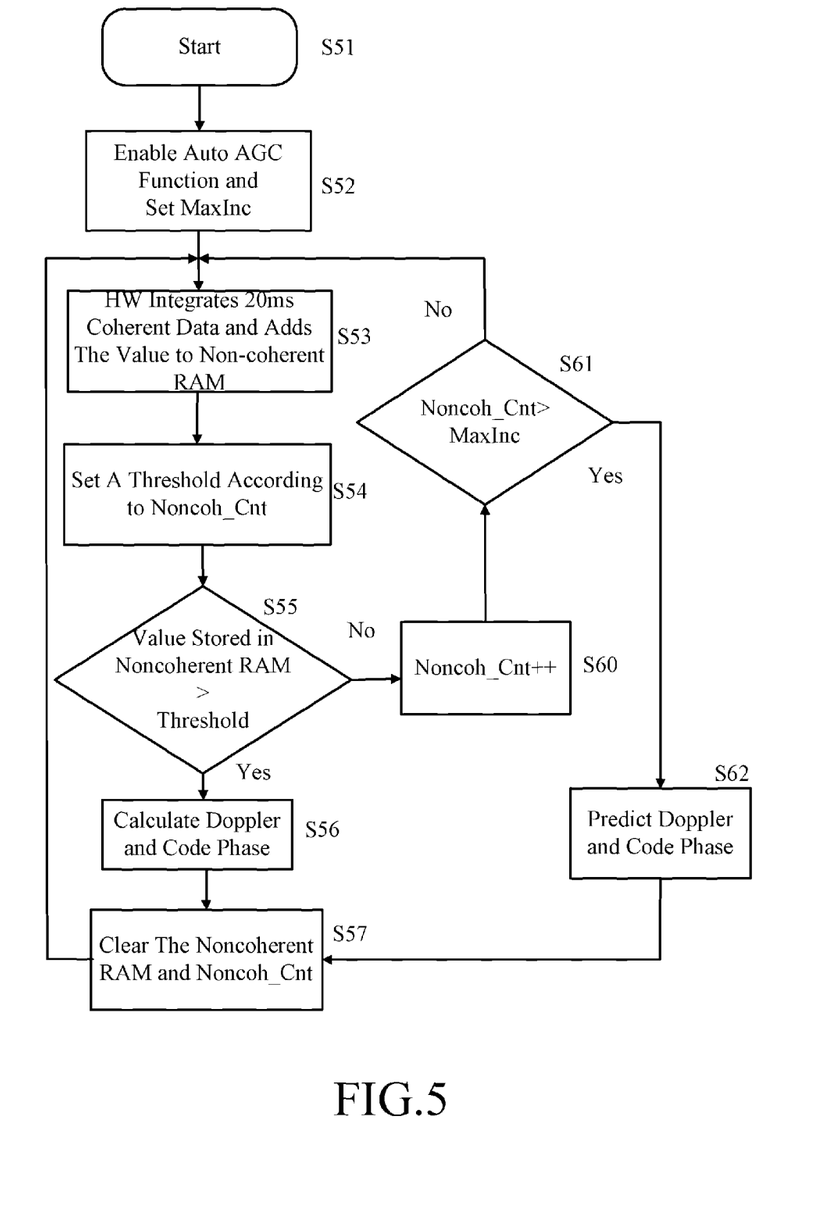
FIG. 5 is a flow chart generally illustrating a process of another embodiment in accordance with the present invention.

As described, the non-coherent integration period is not lengthened without limits A maximum period limit is set in advance. If sufficient signal power fails to be obtained after the non-coherent integration has been executed for a long period, it may mean that the signal is lost. The present invention also provides a solution to such a problem. The method will be described with reference to FIG. 5. Most steps of the process indicated by the flow chart of FIG. 5 are generally similar to that of FIG. 2, but are described more specifically. The main difference is that in the present embodiment, the solution for solving the problem that the signal is failed to be obtained even the non-coherent integration period is extended to the utmost is provided. The process starts from step S51. In step S52, the method of the present invention, which can be referred to as an auto AGC (automatic gain control) function, is activated and the maximum non-coherent count, by which the allowable non-coherent integration period is directly derived, MaxInc, is set. In step S53, hardware integrates 20 ms coherent data , since the coherent integration period is set as 20 ms in this embodiment, and the coherent data is added to the non-coherent (integration) memory 34. In step S54, the controller 50 sets a threshold according to a current non-coherent count, Noncoh_Cnt. When no coherent integration data is sent to the non-coherent memory 34 yet, Noncoh Cnt =0. After the first coherent integration data is stored into the non-coherent memory 34, Noncoh Cnt =1. The rest can be deduced accordingly. In step S55, the comparator 60 compares the value of the signal power stored in the non-coherent memory 34 with a threshold determined by the controller 50. If the signal power has exceeded the threshold, the process goes to step S56. In step S56, further processing is executed, such as calculating Doppler frequency and code phase of the signal. In step S57, the non-coherent RAM 34 is cleared, and the non-coherent count Noncoh_Cnt is zeroed. A new correlation process can be executed. If the value of the signal power stored in the non-coherent RAM 34 does not exceed the threshold, then the non-coherent count Noncoh_Cnt is added by 1 in step S60. The controller 50 checks if Noncoh_Cnt exceeds the upper limt MaxInc in step S61. If not, the integration can be continued. However, if Noncoh_Cnt exceeds MaxInc, it means that the non-coherent integration period has been over a predetermined allowable period. The non-coherent integration should be abandoned. According to the present embodiment, the receiver uses Doppler frequency and/or code phase prediction scheme to estimate the signal. Taking the Doppler frequency as an example, the receiver obtains a Doppler frequency curve from the signal having been received. Then a slope of the Doppler frequency curve is calculated. The receiver then predicts the curve trend based on the slope.

Figure 6:
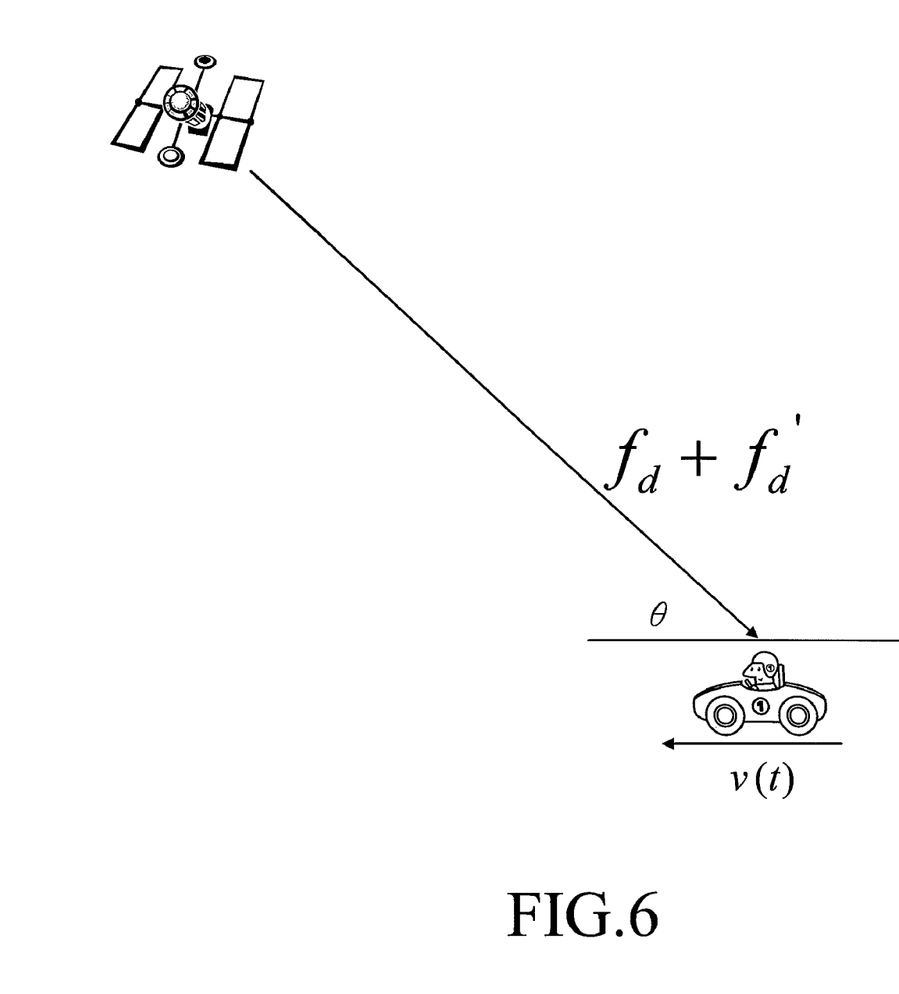
FIG. 6 is a schematic diagram showing prediction for Doppler frequency.

FIG. 6 is a schematic diagram showing prediction for Doppler frequency. In the drawing, $f_d+f_{d'}$ is the Doppler frequency due to the movements of the satellite and the receiver, wherein fd results from satellite movement and fd' results from receiver movement. The term fd' can be obtained by calculating the following equation:

$$f'_d = \frac{f_c}{c} v(t) \cos\theta$$

wherein fc is carrier frequency (e.g. fc of L1 band is 1575.42 MHz); c is the light speed ($3\times10^8$ m/s), θ is the elevation angle of the satellite. As can be seen, the variation of Doppler frequency can be estimated by observing the receiver speed v(t) and the satellite elevation angle θ. For example, if acceleration of the receiver is 1 m/s², and θ=0, then the variation rate of Doppler frequency can be calculated as 5 Hz/sec.

Figure 7:
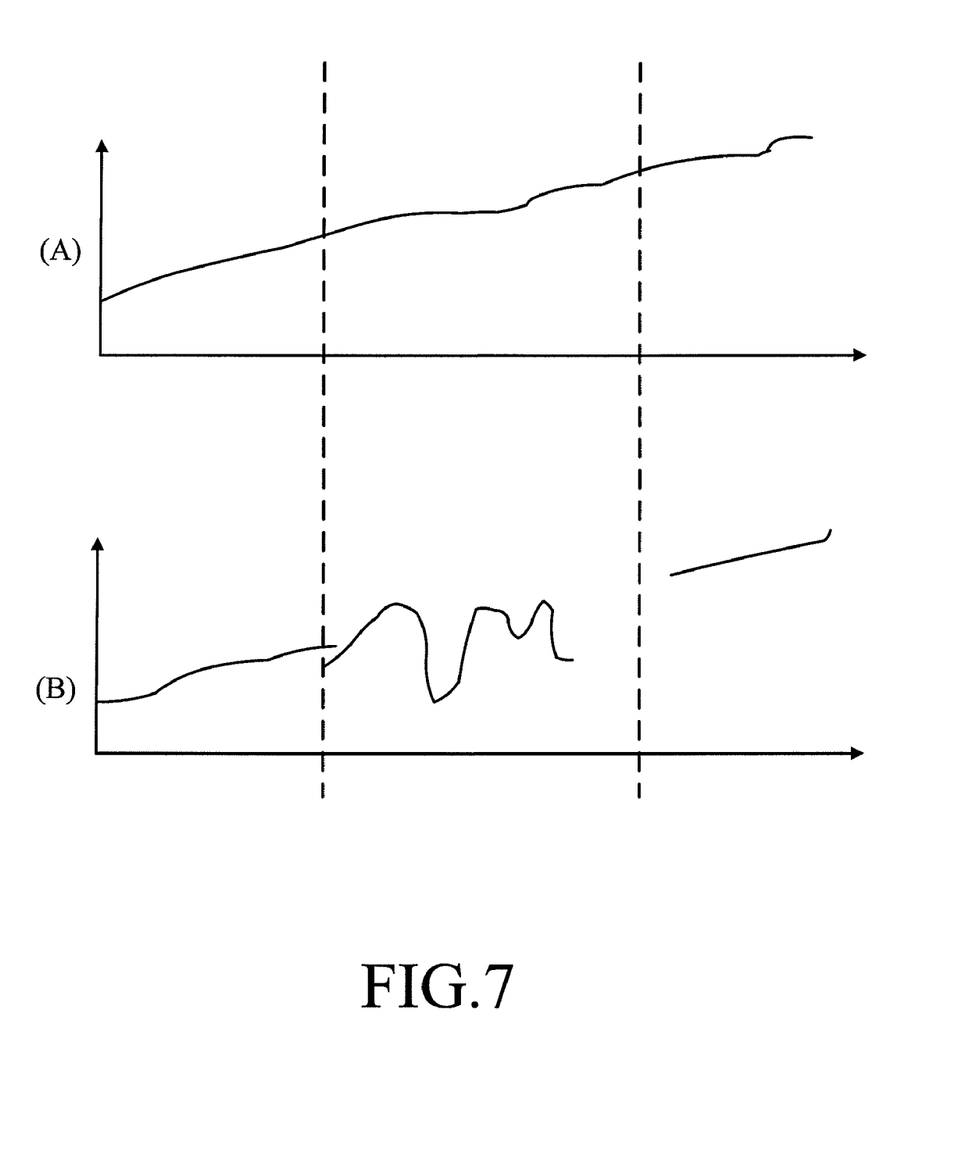
FIG. 7(A) shows a curve of Doppler frequency of conventional receiver.
FIG. 7(B) shows a curve of Doppler frequency of the present invention.

FIGS. 7(A) and (B) respectively show the Doppler frequency curves without and with use of prediction scheme when the receiver loses lock for the signal. As can been seen, by considering the slope of the previous Doppler frequency curve to predict, the section of the curve where the signal is lost lock can be estimated.

Figure 8:
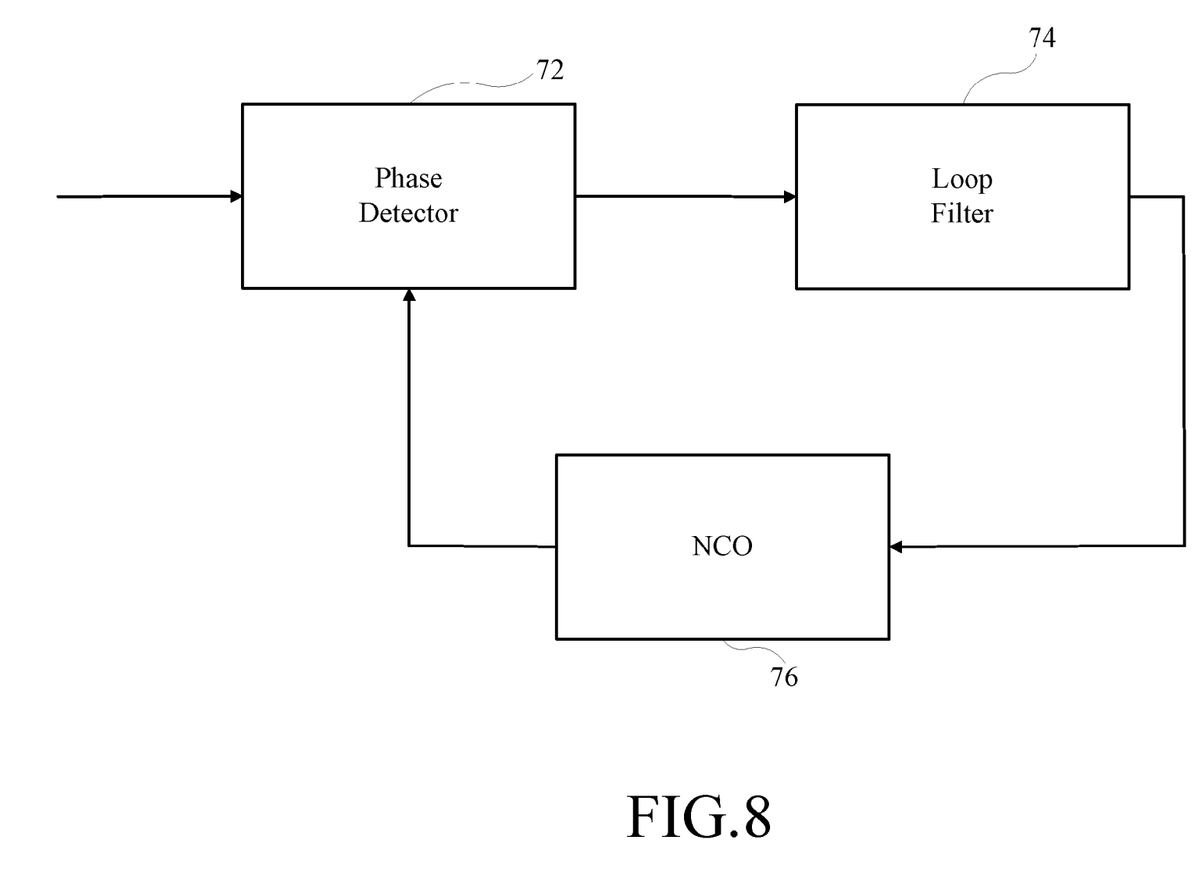
FIG. 8 is a schematic block diagram showing a Doppler frequency processing device in accordance with the present invention.

Another estimation scheme for Doppler frequency curve is free running. FIG. 8 shows a phase lock loop (PLL), which is a Doppler frequency processing device utilized in the receiver. The PLL includes a phase detector 72 detecting phase of the signal, and a loop filter 74 feeding the detected phase back to the phase detector 72 via a numeral controlled oscillator (NCO) 76. If a value controlling the NCO 76 is maintained unchanged regardless of the output of the loop filter 74, the phase curve will keep going with the same slope. It is called free running. When the signal is lost lock, the value controlling the NCO 76 is fixed to the previous value, and so that the phase curve will be generated continuously with the previous slope. By doing so, the signal can be simulated when the receiver loses lock for the signal.

While the preferred embodiment of the present invention has been illustrated and described in details, various modifications and alterations can be made by persons skilled in this art. The embodiment of the present invention is therefore described in an illustrative but not in a restrictive sense. It is intended that the present invention should not be limited to the particular forms as illustrated, and that all modifications and alterations which maintain the spirit and realm of the present invention are within the scope as defined in the appended claims.

What is claimed is:

1. A method for controlling integration of a CDMA signal, said method implemented in a receiver and comprising steps of:

executing a coherent integration for a coherent integration period and storing a coherent integration result into a first memory;

calculating a signal power from the coherent integration result;

accumulating the signal power of each coherent integration into a second memory as a non-coherent integration for a non-coherent integration period;

comparing the accumulated signal power with a threshold; and repeating the above steps if the accumulated signal power has not exceeded the threshold while stopping accumulating if the accumulated signal power exceeds the threshold;

wherein the threshold is variable and is adjusted depending on at least one of the non-coherent integration period and the coherent integration period.

2. The method of claim 1, further comprising clearing up the second memory if the accumulated signal power exceeds the threshold.

3. The method of claim 1, wherein the coherent integration period is divided into a plurality of sub-units, the coherent integration result is calculated to obtain an updated signal power by every sub-unit, the signal power is compared with the threshold, and the signal power is used in further processing if it exceeds the threshold.

4. The method of claim 1, further comprising determining whether a the non-coherent integration period has been over a predetermined limit.

5. The method of claim 4, wherein the non-coherent integration is abandoned if the non-coherent integration period exceeds the limit.

6. The method of claim 4, wherein the signal is estimated by predicting a Doppler frequency curve with a slope of a portion of the curve which has been generated if the non-coherent integration period exceeds the predetermined limit.

7. The method of claim 4, wherein the signal is estimated by instructing Doppler frequency processing to switch to free running if the non-coherent integration period exceeds the predetermined limit.

8. A receiver for receiving CDMA signals, said receiver comprising:

a correlator for executing correlation to the signal;

a coherent integration block executing a coherent integration to the signal for a coherent integration period;

a magnitude calculator calculating a signal power from a result of the coherent integration of the coherent integration block;

a non-coherent integration block accumulating the signal power of each coherent integration for a non-coherent integration period as a non-coherent integration;

a comparator comparing the signal power with a threshold whenever signal power of a coherent integration is accumulated to the non-coherent block ; and a controller stopping the non-coherent integration and passing the signal to further process when the signal power exceeds the threshold;

wherein the threshold is variable and is adjusted depending on at least one of the non -coherent integration period and the coherent integration period.

9. The receiver of claim 8, wherein the coherent integration block has a coherent integration memory for storing the result of coherent integration, the coherent integration memory is cleared up whenever a coherent integration period ends.

10. The receiver of claim 8, wherein the non-coherent integration block has a non-coherent integration memory for storing the accumulated signal power.

11. The receiver of claim 10, wherein the controller clears up the non-coherent integration memory when the signal power exceeds the threshold.

12. The receiver of claim 8, wherein the controller abandons the non-coherent integration if the non-coherent integration period over a predetermined limit.

13. The receiver of claim 8, wherein the controller estimates the signal by predicting a Doppler frequency curve with a slope of a portion of the curve which has been generated if the non-coherent integration period exceeds a predetermined limit

14. The receiver of claim 8, further comprising a Doppler frequency processing device, the controller estimates the signal by instructing Doppler frequency processing to switch to free running if the non-coherent integration period over a predetermined limit.

15. The receiver of claim 8, wherein the coherent integration period is divided into a plurality of sub-units, the magnitude calculator calculates the coherent integration result and updates the signal power by each sub-unit, and the comparator compares the signal power with the threshold.

16. The receiver of claim 15, wherein the coherent integration result is cleared if the signal power exceeds the threshold.

* * * * *